US012757045B2

(12) United States Patent
Hsiao et al.

(10) Patent No.: US 12,757,045 B2
(45) Date of Patent: Oct. 6, 2026

(54) METHOD, APPARATUS, MEDIUM ELECTRONIC DEVICE, AND PROGRAM PRODUCT FOR TESTING WIRELESS LOCAL AREA NETWORK DEVICE

(71) Applicant: Tencent Technology (Shenzhen) Company Limited, Shenzhen (CN)

(72) Inventors: Wei-Ting Hsiao, Shenzhen (CN); Zhen-Xing Wen, Shenzhen (CN); Honghao Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 355 days.

(21) Appl. No.: 18/491,103

(22) Filed: Oct. 20, 2023

(65) Prior Publication Data

US 2024/0049019 A1 Feb. 8, 2024

Related U.S. Application Data

(63) Continuation of application No. PCT/CN2022/128103, filed on Oct. 28, 2022.

(30) Foreign Application Priority Data

Dec. 3, 2021 (CN) ......................... 202111474291.4

(51) Int. Cl.
*H04W 24/08* (2009.01)
*H04W 84/12* (2009.01)

(52) U.S. Cl.
CPC ............ *H04W 24/08* (2013.01); *H04W 84/12* (2013.01)

(58) Field of Classification Search
CPC .............................. H04W 24/08; H04W 84/12
See application file for complete search history.

(56) References Cited

U.S. PATENT DOCUMENTS

| | | | | |
|---|---|---|---|---|
| 2015/0023441 | A1* | 1/2015 | Koo | H04B 7/086 375/267 |
| 2018/0102860 | A1 | 4/2018 | Emmanuel et al. | |
| 2018/0176071 | A1 | 6/2018 | Jabbar et al. | |

FOREIGN PATENT DOCUMENTS

| | | | | |
|---|---|---|---|---|
| CN | 101001183 | A | | 7/2007 |
| CN | 103532782 | A | * | 1/2014 |
| CN | 106470136 | A | | 3/2017 |
| CN | 111431758 | A | | 7/2020 |

(Continued)

OTHER PUBLICATIONS

International Search Report for PCT/CN2022/128103 dated Jan. 13, 2023.

(Continued)

*Primary Examiner* — Duc C Ho
(74) *Attorney, Agent, or Firm* — Sughrue Mion, PLLC

(57) ABSTRACT

Wireless local area network (WLAN) device testing that includes acquiring a data flow feature value used in testing a WLAN device, generating a WLAN simulation environment based on an interference environment index feature of the WLAN, controlling a data transmitter in the WLAN simulation environment to transmit a data packet based on the data flow feature value, acquiring a reception status of the data receiver device for the data packet, and based on the reception status of the data receiver device for the data packet, testing the network performance in the simulation environment.

20 Claims, 7 Drawing Sheets

(56) References Cited

FOREIGN PATENT DOCUMENTS

| | | |
|---|---|---|
| CN | 112165408 A | 1/2021 |
| CN | 111431758 B | 5/2022 |

OTHER PUBLICATIONS

Office Action issued on Jul. 22, 2025 in CN Application No. 202111474291.4.

* cited by examiner

Indoor environment

Conference room environment

METHOD, APPARATUS, MEDIUM ELECTRONIC DEVICE, AND PROGRAM PRODUCT FOR TESTING WIRELESS LOCAL AREA NETWORK DEVICE

RELATED APPLICATION

The present disclosure is a continuation application of International Patent Application No. PCT/CN2022/128103 filed on Oct. 28, 2022 which claims priority to Chinese Patent Application No. 202111474291.4 and filed with the National Intellectual Property Administration, PRC on Dec. 3, 2021, the disclosures of which are incorporated herein by reference in their entireties.

FIELD

The present disclosure relates to the field of computer and communication technologies, and specifically, to a method, apparatus, medium, an electronic device, and program product for testing wireless local area network (WLAN) device (s).

BACKGROUND

In the development and evaluation process of the wireless fidelity (Wi-Fi) technology, the performance experience of a Wi-Fi device in the Wi-Fi network usually needs to be evaluated. However, the evaluation solution proposed in the related art relies on non-network performance of the Wi-Fi device (such as the operator network and the computing processing performance of the Wi-Fi device), resulting in an inaccurate test result. Thus, there is a need to improve the accuracy of a network performance test of a Wi-Fi device.

SUMMARY

Embodiments of the present disclosure may provide a WLAN device test method and apparatus, a medium, an electronic device, and a program product, which may improve the accuracy of network performance tests of Wi-Fi devices at least to a certain extent.

Other characteristics and advantages of the present disclosure become apparent from the following detailed description, or may be learned in part through the practice of the present disclosure.

According to some embodiments of the present disclosure, a method for testing a WLAN device may be provided. The method may be performed by an electronic device, the method including: acquiring a data flow feature value used for testing a WLAN device; constructing, according to an interference environment index feature of a WLAN, a WLAN simulation environment corresponding to the interference environment index feature; in the WLAN simulation environment, controlling a data transmitter device to transmit a data packet according to the data flow feature value, and acquiring a reception status of a data receiver device for the data packet; and testing network performance of at least one of the data transmitter device or the data receiver device in the WLAN simulation environment according to the reception status of the data receiver device for the data packet.

According to some embodiments of the present disclosure, an apparatus for testing a WLAN device may be provided. The apparatus may include: an acquisition unit, configured to acquire a data flow feature value used for testing a WLAN device; a construction unit, configured to construct, according to an interference environment index feature of a WLAN, a WLAN simulation environment corresponding to the interference environment index feature; a processing unit, configured to: in the WLAN simulation environment, control a data transmitter device to transmit a data packet according to the data flow feature value, and acquire a reception status of a data receiver device for the data packet; and the processing unit being further configured to test network performance of at least one of the data transmitter device or the data receiver device in the WLAN simulation environment according to the reception status of the data receiver device for the data packet.

According to some embodiments of the present disclosure, a computer-readable medium may be provided. The computer-readable medium may store a computer program which when executed by a processor, implements the WLAN device test method according to the foregoing embodiments.

According to some embodiments of the present disclosure, an electronic device may be provided, including: one or more processors; and a storage apparatus, configured to store one or more programs, the one or more programs, when executed by the one or more processors, causing the electronic device to implement the WLAN device test method according to the foregoing embodiments.

According to some embodiments of the present disclosure, a computer program product or a computer program may be provided. The computer program product or the computer program includes computer instructions, the computer instructions being stored in a computer-readable storage medium. A processor of a computer device reads the computer instructions from the computer-readable storage medium and executes the computer instructions to cause the computer device to perform the WLAN device test method provided in the foregoing various embodiments.

In the technical solutions provided in some embodiments of the present disclosure, by acquiring a data flow feature value used for testing a WLAN device, constructing, according to an interference environment index feature of a WLAN, a WLAN simulation environment corresponding to the interference environment index feature, then in the WLAN simulation environment, controlling a data transmitter device to transmit a data packet according to the data flow feature value, and acquiring a reception status of a data receiver device for the data packet, to test network performance of at least one of the data transmitter device or the data receiver device in the WLAN simulation environment according to the reception status of the data receiver device for the data packet, a relatively stable WLAN simulation environment can be constructed based on the interference environment index feature of the WLAN, and simulation of a data packet in an actual scenario can be implemented by controlling the data transmitter device to transmit the data packet according to the data flow feature value, which avoids influence of other factors on the network performance test, thereby helping to improve the accuracy of the network performance test of a Wi-Fi device.

It should be understood that, the foregoing general descriptions and the following detailed descriptions are merely for illustration and explanation purposes and are not intended to unduly limit the present disclosure.

DESCRIPTION OF EMBODIMENTS

Figure 1:
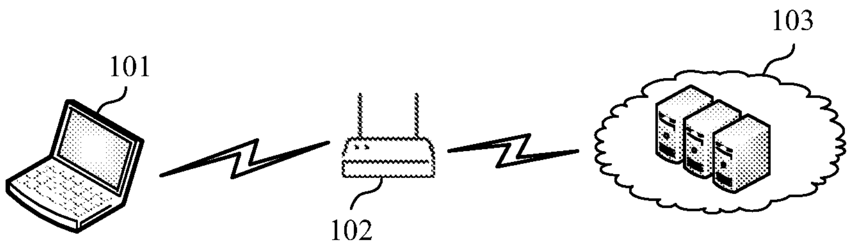
FIG. 1 is a schematic diagram of recording a data flow feature value according to some embodiments.

Exemplary implementations are described more comprehensively with reference to the accompanying drawings. However, the exemplary implementations can be implemented in various forms, and are not to be understood as being merely limited to these examples. Instead, the implementations are provided to make the present disclosure more comprehensive and complete and fully convey the idea of the exemplary implementations to a person skilled in the art.

In addition, the features, structures, or characteristics described in the present disclosure may be combined in one or more embodiments in any appropriate manner. In the following description, many specific details are provided for fully understanding of the embodiments of the present disclosure. However, a person skilled in the art may appreciate that, it is may not be necessary to use all the detailed features in the embodiments during practice of the technical solutions of the present disclosure, one or more of the specific details may be omitted, or other methods, components, apparatus, steps, or the like may be used.

The block diagrams shown in the accompanying drawings is merely a functional entity and does not necessarily correspond to a physically independent entity. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for description, and do not necessarily include all content and operations/steps, and are not necessarily performed in the described orders. For example, some operations/steps may be further divided, while some operations/steps may be combined or partially combined. Therefore, the actual execution order may vary depending on an actual situation.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

It is to be understood that in specific implementations of the present disclosure, relevant data such as experience indicator features are involved. When the foregoing embodiments of the present disclosure are applied to a specific product or technology, user permission or consent needs to be obtained, and the collection, use, and processing of the relevant data need to comply with relevant laws, regulations, and standards of relevant countries and regions.

Wireless local area network (WLAN) refers to the application of the wireless communication technology to interconnect computer devices to form a network system that can implement mutual communication and resource sharing. The essential characteristic of the WLAN is that communication cables are no longer used to connect a computer to the network, but perform the connection in a wireless manner, making network construction and terminal movement more flexible. For example, a station (STA) in Wi-Fi establishes a connection with an access point (AP) in a wireless manner, and then perform data exchange in a wireless communication manner. Currently, when evaluating the network performance of a Wi-Fi device, the two most important indicators are delay and throughput. Therefore, during evaluation of the efficiency of applications (such as a cloud video application and a game application) running on the Wi-Fi device, these two indicators are mostly evaluated.

In the related art, during evaluation of the delays of applications running on the Wi-Fi device, a manner of a packet Internet groper (ping) test is usually used. Because data packet features (including length distributions of data packets, proportions of uplink and downlink data) of different applications are different, in order to make a single test scenario to be capable of covering the needs of various application evaluations as much as possible, the ping test is usually used to measure a total spent time and a packet loss rate of the following process: after an Internet control message protocol (ICMP) packet at the IP layer is transmitted from a transmitting end host, it reaches a host at the destination IP address through the Wi-Fi wireless network and the back-end telecommunication network, then another ICMP packet is responded from the host at the destination IP address, and it returns to the Wi-Fi wireless network through the back-end telecommunication network and finally returns to the packet-transmitting end host.

The total spent time is actually a round trip time (RTT) value. If any network is congested in the foregoing process, an increase in the round-trip delay will be caused. In addition, if any host in the paths that have been passed through in the process fails and the packet cannot be delivered, the packet-transmitting end host cannot receive the ICMP packet replied by the host at the destination IP address, consequently being recorded as a packet loss. The ping test is a simple request-reply mechanism. A shorter total spent time and a lower packet loss ratio can ensure a lower network full-link delay. Theoretically, only when the server IP address of the cloud video application is used as the destination IP address, relatively accurate results can be obtained through measurement. However, because the server IP address used by each cloud video application is different and is usually not disclosed to the outside world, another known general server address is usually used as the destination address for testing.

However, use of the ping test mainly has two problems. First, the default ICMP packet length used in the ping test is 32 bytes, 46 bytes in the header part are added, and the total length is 78 bytes, no more than 100 bytes. Because the network data packet size of 100 bytes is suitable for a network connectivity test at low traffic costs, the response time is short, but for network performance evaluation of some applications (such as cloud video applications), such data packet size, for general cloud video applications, requires high bandwidth to meet the needs of experience. Therefore, the downlink data packet size usually varies between 500 to 20,000 bytes, with a very small proportion (less than 1%) below 500 bytes. Therefore, using the ping test cannot truly reflect the network traffic of cloud video data flows. Especially in the Wi-Fi wireless air interface environment, data packets are susceptible to environmental interference, causing a packet transmission failure and it is necessary to perform retransmission at a media access control (MAC) layer, resulting in relatively large fluctuations in the delay, which is also a manifestation of network performance degradation. However, ICMP packets used in the ping test are relatively small, and the relatively small packets are not easily destroyed in the complex interference environment and retransmitted. Consequently, actual network problems in a cloud video scenario cannot be truly reflected. Second, the ping test requires a reply from the host at the destination IP address, which is a combination of an ICMP echo request and an ICMP echo response. The delay measured by the test is an RTT value, which is superposition of round-trip network transmission times, and statistics on the delays required for transmitting (uplink) and returning (downlink) cannot be collected in an individually separated manner. The amount of uplink and downlink data in a cloud video is not balanced, usually with a ratio of about 10:1 between downlink and uplink, so that only when the uplink and downlink data delays can be separately evaluated, it can be understood. Currently, the ping test cannot meet this requirement.

In the related art, when evaluating the throughput of an application running on a Wi-Fi device, a solution of downloading a large file for testing is usually used. Specifically, in addition to the network delay, in order to ensure the large bandwidth requirement of the cloud video application, the time required for completing the downloading is usually calculated in a manner of letting the Wi-Fi device download a large file from a specific host. A result obtained by dividing the file size by the time required for the downloading is a throughput of the network, then the impact of non-Wi-Fi air interface networks can be isolated by placing the specific host in the same local network as the Wi-Fi device. Based on this, the maximum throughput of the Wi-Fi device in a specific scenario is evaluated. A higher throughput represents a greater network capacity, so that it can be concluded that the Wi-Fi network performance is relatively good. In addition to using solution of single large file downloading, there are also solutions of using a plurality of files of different sizes. The throughput is calculated by calculating a total spent time for completing downloading of all the files, and in this way, this is relatively similar to evaluating an average throughput of the Wi-Fi device. For the cloud video application, the maximum throughput and the average throughput are both indicators that can be used for evaluating network efficiency.

Compared with the ping test, for large file downloading, relatively large files may be selected to overcome the problem caused by excessively small ping test packets. In addition, file downloading is a continuous process (for example, one to three minutes), which can indeed reflect the network traffic of real cloud video data flows. However, the current method of calculating a network throughput based on the total spent time for file downloading can only show the average network performance during this period of time, and cannot reflect whether there are fluctuations in the network performance during this period of time in a fine-grained manner. Because in cloud video and cloud game scenarios, excessively large network performance fluctuations (for example, the throughput fluctuates rapidly between 50 Mbps and 5 Mbps) are the main experience problem that causes video lag and poor cloud game control, in order to effectively evaluate the network performance of the cloud video application on the Wi-Fi device, it is necessary to have objective standards for measuring throughput fluctuations. Therefore, using the solution of downloading a large file for testing cannot resolve this problem.

Based on this, some embodiments of the present disclosure provides a new WLAN device test solution, which can construct a relatively stable WLAN simulation environment based on an interference environment index feature of a WLAN, and implement simulation of a data packet in an actual scenario by controlling a data transmitter device to transmit a data packet according to a data flow feature value, which avoids influence of other factors on the network performance test, thereby helping to improve the accuracy of the network performance test of a Wi-Fi device.

Specifically, as shown in FIG. 1, a Wi-Fi device 101 may be connected to an access point device 102, and the access point device 102 is connected to a cloud 103. When the Wi-Fi device 101 runs a specified application (for example, a cloud video application), the cloud 103 transmits a data flow to the Wi-Fi device 101 through the access point device 102. In this process, a packet capture tool may be used to capture the data flow transmitted to the Wi-Fi device 101, to obtain a feature value of the data flow, for example, a data packet average length in the data flow, a data packet length range in the data flow, a data packet average transmission interval in the data flow, a data packet transmission interval range in the data flow, a maximum quantity of concurrent transmission control protocol (TCP) flows, or a maximum quantity of concurrent user datagram protocol (UDP) flows.

In addition, the interference signals in the interference environment may be recorded and analyzed. Based on values of feature variables obtained through recording and analysis, an interference degree of the original scenario recorded can be simulated offline in the laboratory environment to restore a stable interference scenario, to test the network performance in a simulated interference environment.

Figure 2:
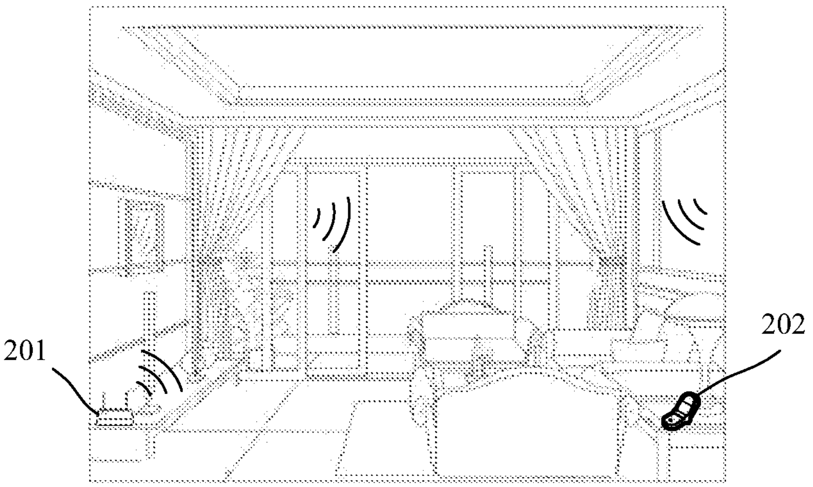
FIG. 2 is a schematic diagram of recording an interference environment feature value according to some embodiments.

Specifically, in an application scenario of the present disclosure, as shown in FIG. 2, in an indoor environment, due to the obstruction of furniture and the interference of another Wi-Fi device (for example, a router), there are different degrees of interference in the indoor environment. In order to measure the specific interference situation, a test device 202 may be connected to a designated router 201 (that is, an access point device), and then interference indicator information generated by an interference source in the indoor environment for the test device 202 may be measured to obtain indicator measurement results, and then statistical results of indicator feature values may be generated based on the indicator measurement results. The statistical results of the indicator feature values include an interference signal feature value statistical result and an experience indicator feature value statistical result.

The foregoing indicator measurement results may include an interference signal measurement result and an experience indicator measurement result. The interference signal measurement result may include at least one of the following information: the quantity of WLAN devices (for example, Wi-Fi devices) that interfere with the test device 202, signal emission strength of the WLAN devices that interfere with the test device 202, a channel utilization rate of a WLAN channel at which the test device 202 is located, a signal-to-noise ratio of the WLAN channel at which the test device 202 is located, an error vector magnitude (EVM) of the WLAN channel at which the test device 202 is located, a packet error rate (PER) of the WLAN to which the test device 202 is connected, a traffic of WLAN data flows that interfere with the test device 202, signal strength of a non-WLAN that interferes with the test device 202, or a bandwidth of the non-WLAN that interferes with the test device 202.

In some embodiments, the interference signal feature value statistical result may include feature statistical values of a WLAN interference signal. The feature statistical values may be, for example, a channel utilization rate, a signal-to-noise ratio, and an error vector amplitude. The interference signal feature value statistical result may include feature measurement values of the WLAN interference signal. The feature measurement values may include: the quantity of WLAN devices that cause interference, the maximum signal strength of the WLAN devices that cause interference, the most frequently used bandwidth in the WLAN devices that cause interference, and a total traffic used by the WLAN devices that cause interference.

The foregoing WLAN interference signal may be a same-frequency interference signal, an adjacent-frequency interference signal, or an overlapping-frequency interference signal of the Wi-Fi network to which the test device 202 is connected.

In some embodiments, the interference signal feature value statistical result further includes feature statistical values of a non-WLAN interference signal. The feature statistical values of the non-WLAN interference signal include: a bandwidth distribution and corresponding signal strength of the non-WLAN interference signal in each set time interval. The non-WLAN interference signal may be, for example, an interference signal of a mobile communication network (for example, the 4G/5G network).

After the interference signal feature value statistical result and the experience indicator feature value statistical result are obtained, a simulation environment corresponding to the indoor environment may be constructed based on the interference signal feature values contained in the interference signal feature value statistical result, so that the experience index measurement value in the simulation environment matches the experience indicator feature value statistical result.

Figure 3:
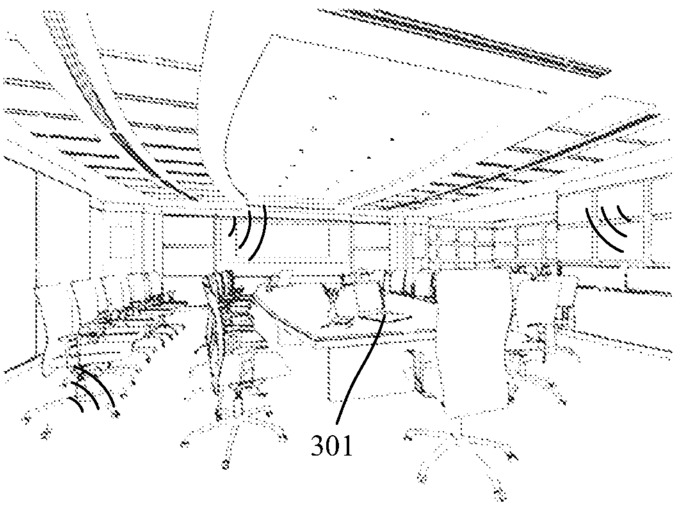
FIG. 3 is a schematic diagram of recording an interference environment feature value according to some embodiments.

In addition to the indoor environment, as shown in FIG. 3, there are also various interferences in a conference room environment. Therefore, after a test device 301 is connected to a designated router (that is, an access point device), interference indicator information generated by an interference source in the conference room environment for the test device 301 may be measured to obtain indicator measurement results, and then statistical results of indicator feature values including an interference signal feature value statistical result and an experience indicator feature value statistical result are generated based on the indicator measurement results. After the interference signal feature value statistical result and the experience indicator feature value statistical result are obtained, a simulation environment corresponding to the conference room environment may be constructed based on the interference signal feature values contained in the interference signal feature value statistical result, so that the experience index measurement value in the simulation environment matches the experience indicator feature value statistical result.

Figure 4:
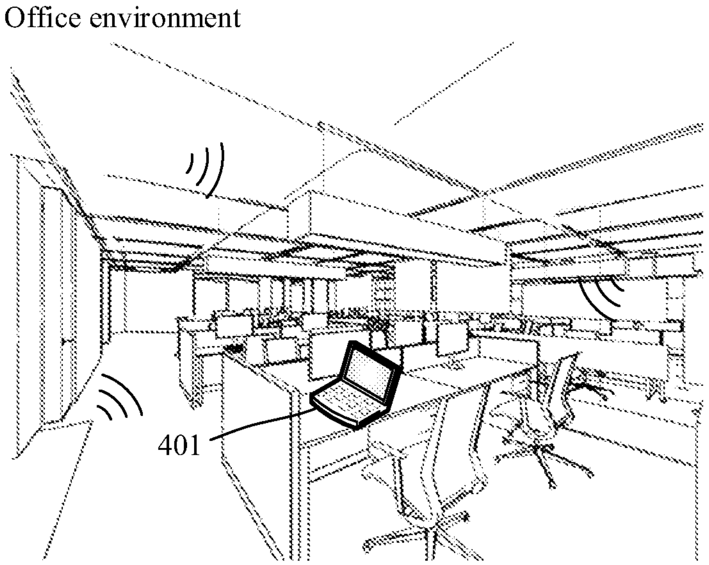
FIG. 4 is a schematic diagram of recording an interference environment feature value according to some embodiments.

As shown in FIG. 4, there are also various interferences in an office environment. Therefore, after a test device 401 is connected to a designated router (that is, an access point device), interference indicator information generated by an interference source in the office environment for the test device 401 may be measured to obtain indicator measurement results, and then statistical results of indicator feature values including an interference signal feature value statistical result and an experience indicator feature value statistical result are generated based on the indicator measurement results. After the interference signal feature value statistical result and the experience indicator feature value statistical result are obtained, a simulation environment corresponding to the office environment may be constructed based on the interference signal feature values contained in the interference signal feature value statistical result, so that the experience index measurement value in the simulation environment matches the experience indicator feature value statistical result.

For other environments, such as a subway station environment, and a high-speed moving environment (for example, an environment in a vehicle), the technical solutions of the embodiments of the present disclosure may also be used to perform measurement and construct corresponding simulation environments.

After a simulation environment corresponding to the interference environment (which may be a selected interference environment, for example, an indoor environment) is constructed and a data flow feature value is acquired, in the constructed simulation environment, a data transmitter device may be controlled to transmit a data packet according to the data flow feature value, and a reception status of a data receiver device for the data packet may be acquired, and then network performance of at least one of the data transmitter device or the data receiver device in the WLAN simulation environment may be tested according to the reception status of the data receiver device for the data packet.

It can be seen that, by using the technical solution of this embodiment of the present disclosure, a relatively stable WLAN simulation environment can be constructed based on an interference environment index feature of a WLAN, and simulation of a data packet in an actual scenario can be implemented by controlling a data transmitter device to transmit a data packet according to a data flow feature value, which avoids influence of other factors on the network performance test, thereby helping to improve the accuracy of the network performance test of a Wi-Fi device.

The implementation details of the technical solutions in the embodiments of the present disclosure are described below in detail.

Figure 5:
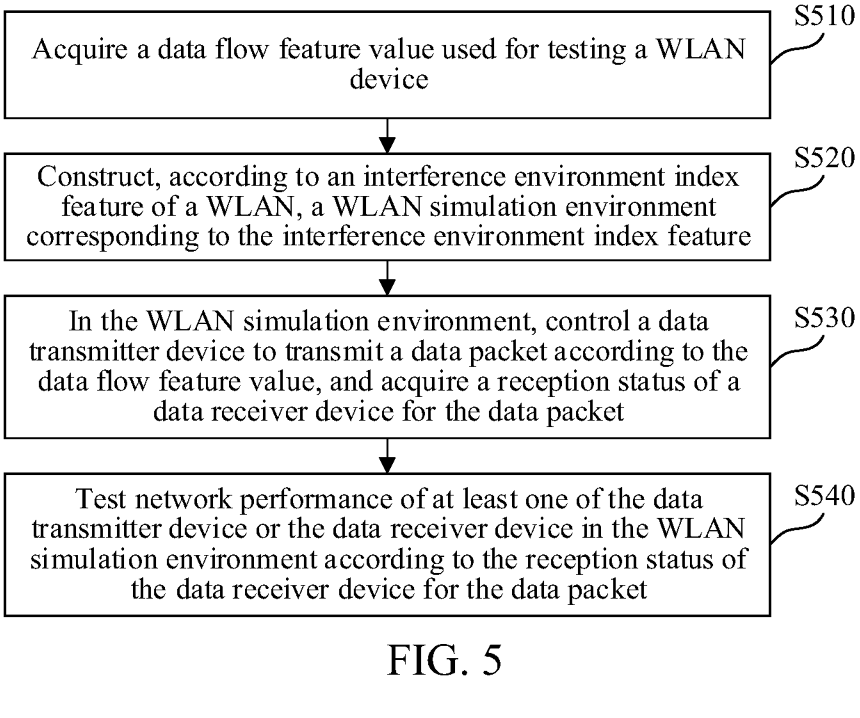
FIG. 5 is a flowchart of a WLAN device test method according to some embodiments.

FIG. 5 is a flowchart of a WLAN device test method according to some embodiments of the present disclosure. The WLAN device test method may be performed by a device or system having a computing processing function.

Referring to FIG. 5, the WLAN device test method includes at least S510 to S540. A detailed description is as follows:

S510: Acquire a data flow feature value used for testing a WLAN device.

In some embodiments, the data flow feature value may be acquired from a specific application server. For example, the data flow is a cloud video data flow, then the data flow feature value may be directly acquired from a cloud video server.

In some embodiments of the present disclosure, the data flow feature value may alternatively be obtained by capturing and analyzing a data flow transmitted by an application server. Specifically, in a process of receiving a specified data flow by a specified device, the specified data flow may be captured, then a feature value of the specified data flow may be generated according to a capture result for the specified data flow, and the feature value of the specified data flow may be used as the data flow feature value used for testing the WLAN device.

In some embodiments, the specified device may be a WLAN device such as a smartphone, a tablet computer, or a notebook computer. The specified data flow may be a cloud video data flow, a cloud game data flow, or the like. In order to ensure the accuracy of the acquired data flow feature value, abnormal interference that appears in the packet capture and analysis process may be avoided as much as possible. For example, an occasion with relatively little interference may be selected for packet capture and analysis.

In some embodiments, the data flow feature value includes at least one of the following: a data packet average length in a data flow, a data packet length range in the data flow, a data packet average transmission interval in the data flow, a data packet transmission interval range in the data flow, a maximum quantity of concurrent transmission control protocol (TCP) flows, or a maximum quantity of concurrent user datagram protocol (UDP) flows.

S520: Construct, according to an interference environment index feature of a WLAN, a WLAN simulation environment corresponding to the interference environment index feature.

In some embodiments of the present disclosure, the interference environment index feature of the WLAN may be generated according to measurement results obtained by measuring the interference index information in the WLAN interference environment. For example, the interference index information may be measured separately for different interference environments (such as an indoor environment, an office environment, and a subway environment), and then the interference environment index feature can be generated according to the measurement results.

S530: In the WLAN simulation environment, control a data transmitter device to transmit a data packet according to the data flow feature value, and acquire a reception status of a data receiver device for the data packet.

In some embodiments of the present disclosure, the data packet transmitted by the data transmitter device may include local time information of the data transmitter device, and in order to facilitate the data receiver device to collect delay statistics on the received data packet, before the controlling a data transmitter device to transmit a data packet according to the data flow feature value, the data transmitter device may be controlled to perform clock synchronization with the data receiver device.

In some embodiments of the present disclosure, during the controlling a data transmitter device to transmit a data packet according to the data flow feature value, the data transmitter device may be controlled to transmit a data packet according to the data flow feature value within at least one time window. In this case, a reception status of the data receiver device for the data packet transmitted by the data transmitter device in each time window may be acquired, and then the network performance of the device may be evaluated based on the reception status for the data packet transmitted by the data transmitter device in each time window.

S540: Test network performance of at least one of the data transmitter device or the data receiver device in the WLAN simulation environment according to the reception status of the data receiver device for the data packet.

Figure 6:
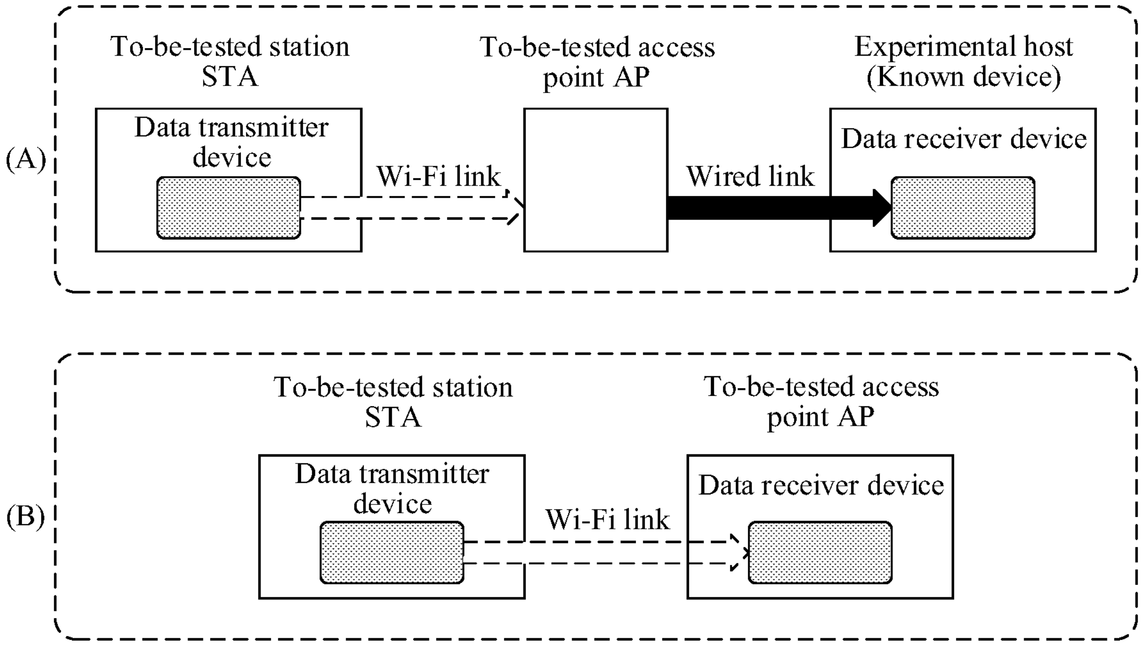
FIG. 6 is a schematic diagram of a test scenario according to some embodiments.

In some embodiments of the present disclosure, as shown in (A) of FIG. 6, if the data transmitter device is a to-be-tested station device, and the data receiver device is a known device (that is, an experimental host) connected to a to-be-tested access point device, during the test, uplink network performance of a device combination formed by the to-be-tested access point device and the to-be-tested station device may be tested according to the reception status of the data receiver device (that is, the known device) for the data packet transmitted by the to-be-tested station device. In some embodiments, in order to prevent the known device from affecting the network performance test process between the to-be-tested access point device and the to-be-tested station device, the connection between the known device and the to-be-tested access point device may be set to a wired link, and the known device, the to-be-tested access point device, and the to-be-tested station device are located in the same WLAN.

In some embodiments of the present disclosure, as shown in (B) of FIG. 6, if the data transmitter device is a to-be-tested station device, and the data receiver device is a to-be-tested access point device, during the test, uplink network performance of a device combination formed by the to-be-tested access point device and the to-be-tested station device may be tested according to the reception status of the data receiver device (that is, the to-be-tested access point device) for the data packet transmitted by the to-be-tested station device.

Figure 7:
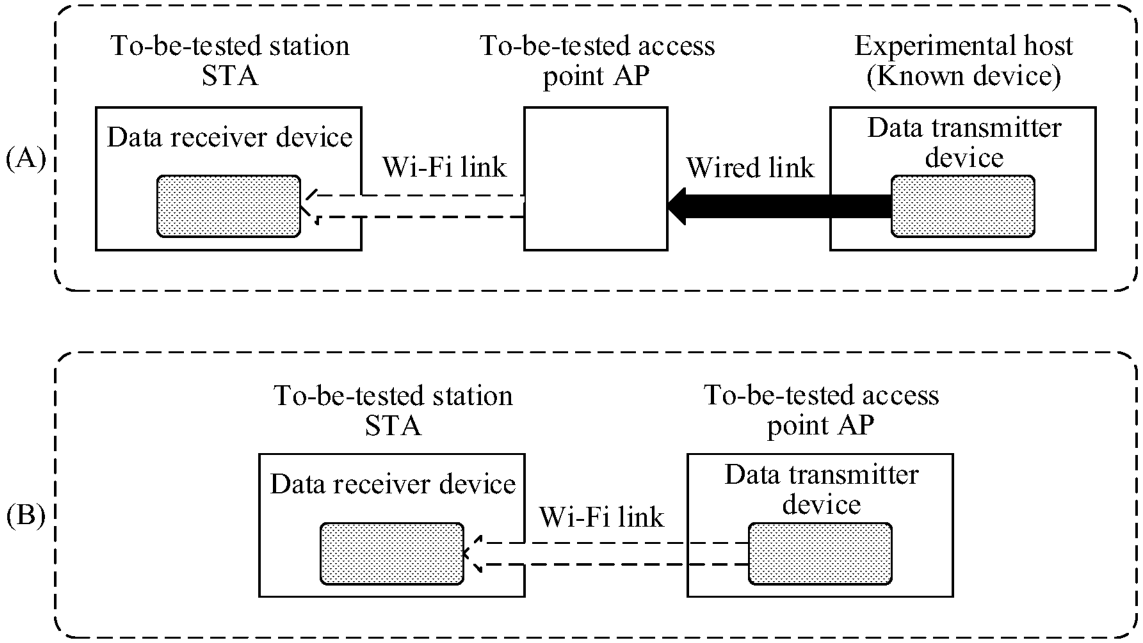
FIG. 7 is a schematic diagram of a test scenario according some embodiments.

In some embodiments of the present disclosure, as shown in (A) of FIG. 7, if the data transmitter device is a known device (that is, an experimental host) connected to a to-be-tested access point device, and the data receiver device is a to-be-tested station device, during the test, downlink network performance of a device combination formed by the to-be-tested access point device and the to-be-tested station device may be tested according to the reception status of the to-be-tested station device for the data packet transmitted by the data transmitter device (that is, the known device). In some embodiments, in order to prevent the known device from affecting the network performance test process between the to-be-tested access point device and the to-be-tested station device, the connection between the known device and the to-be-tested access point device may be set to a wired link, and the known device, the to-be-tested access point device, and the to-be-tested station device are located in the same WLAN.

In some embodiments of the present disclosure, as shown in (B) of FIG. 7, if the data transmitter device is a to-be-tested access point device, and the data receiver device is a to-be-tested station device, during the test, downlink network performance of a device combination formed by the to-be-tested access point device and the to-be-tested station device may be tested according to the reception status of the to-be-tested station device for the data packet transmitted by the to-be-tested access point device.

Figure 8:
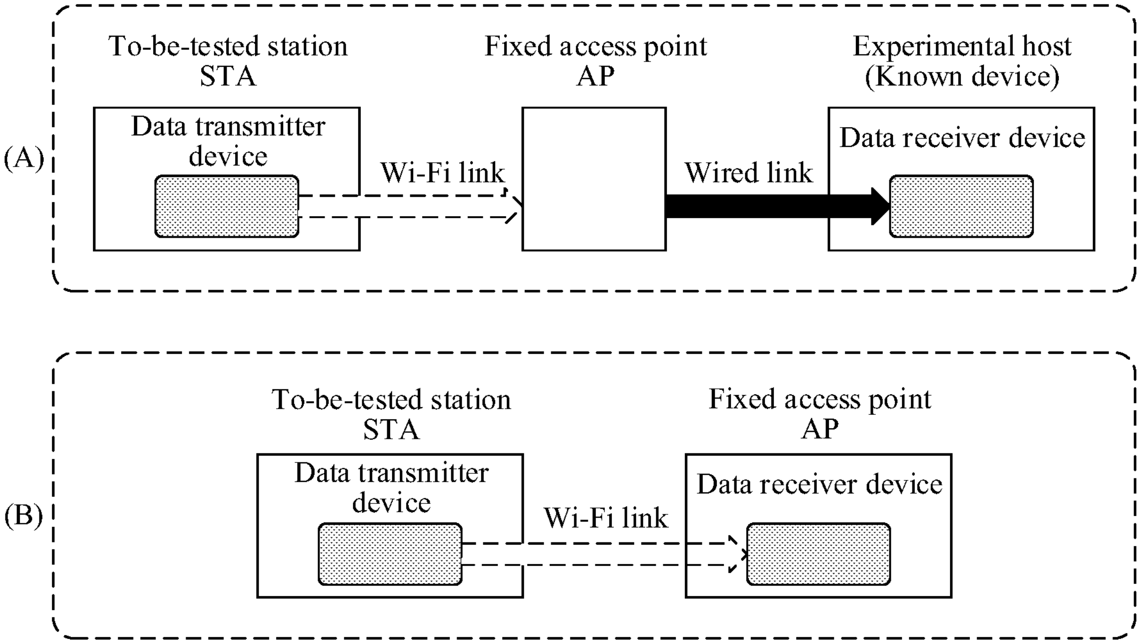
FIG. 8 is a schematic diagram of a test scenario according to some embodiments.

In some embodiments of the present disclosure, as shown in (A) of FIG. 8, if the data transmitter device is a to-be-tested station device (there may be a plurality of to-be-tested station devices), and the data receiver device is a known device (that is, an experimental host) connected to a fixed access point device (the fixed access point device is a specified access point device), during the test, uplink network performance of the plurality of to-be-tested station devices may be tested according to reception statuses of the data receiver device (that is, the known device) for data packets respectively transmitted by the plurality of to-be-tested station device, for example, the relative uplink network performance of the to-be-tested station devices is tested. In some embodiments, in order to prevent the known device from affecting the network performance test process between the access point device and the to-be-tested station device, the connection between the known device and the access point device may be set to a wired link, and the known device, the access point device, and the to-be-tested station device are located in the same WLAN.

In some embodiments of the present disclosure, as shown in (B) of FIG. 8, if the data transmitter device is a to-be-tested station device (there may be a plurality of to-be-tested station devices), and the data receiver device is a fixed access point device (the fixed access point device is a specified access point device), during the test, uplink network performance of the plurality of to-be-tested station devices may be tested according to reception statuses of the data receiver device (that is, the fixed access point device) for data packets respectively transmitted by the plurality of to-be-tested station device, for example, the relative uplink network performance of the to-be-tested station devices is tested.

Figure 9:
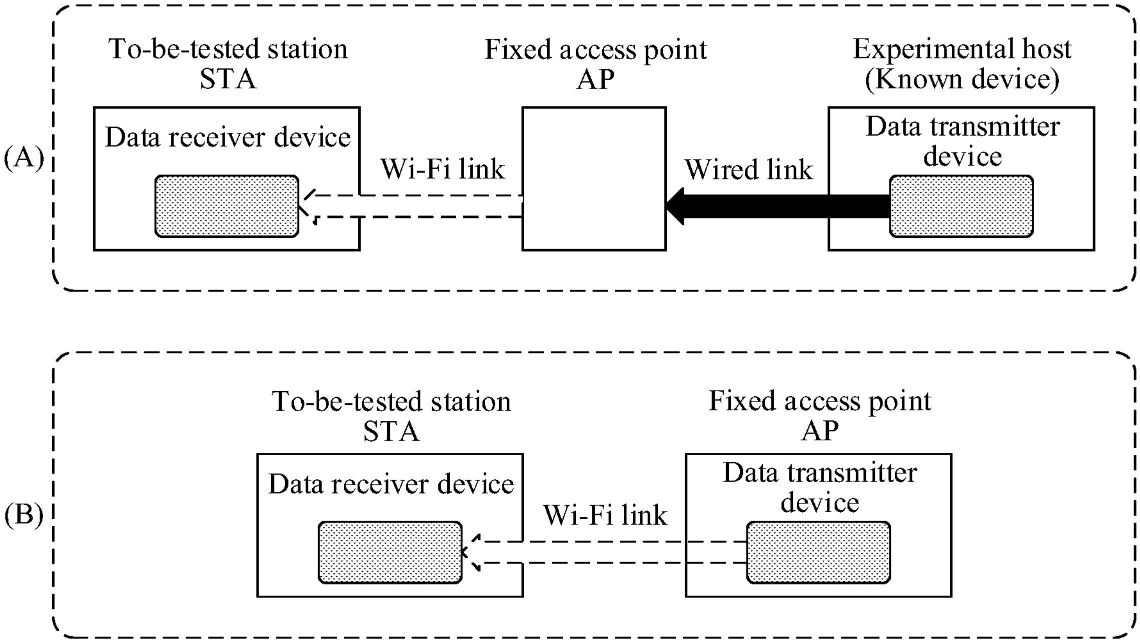
FIG. 9 is a schematic diagram of a test scenario according to some embodiments.

In some embodiments of the present disclosure, as shown in (A) of FIG. 9, if the data transmitter device is a known device (that is, an experimental host) connected to a fixed access point device (the fixed access point device is a specified access point device), and the data receiver device may be a plurality of to-be-tested station devices (the figure only shows a case of one to-be-tested station device), during the test, downlink network performance of the plurality of to-be-tested station devices may be tested according to a reception status of each of the plurality of to-be-tested station devices for the data packet transmitted by the data transmitter device (that is, the known device). In some embodiments, in order to prevent the known device from affecting the network performance test process between the access point device and the to-be-tested station device, the connection between the known device and the access point device may be set to a wired link, and the known device, the access point device, and the to-be-tested station device are located in the same WLAN.

In some embodiments of the present disclosure, as shown in (B) of FIG. 9, if the data transmitter device is a fixed access point device (the fixed access point device is a specified access point device), and the data receiver device is a plurality of to-be-tested station devices (the figure only shows a case of one to-be-tested station device), during the test, downlink network performance of the plurality of to-be-tested station devices may be tested according to a reception status of each of the plurality of to-be-tested station devices for the data packet transmitted by the data transmitter device (that is, the fixed access point device).

Figure 10:
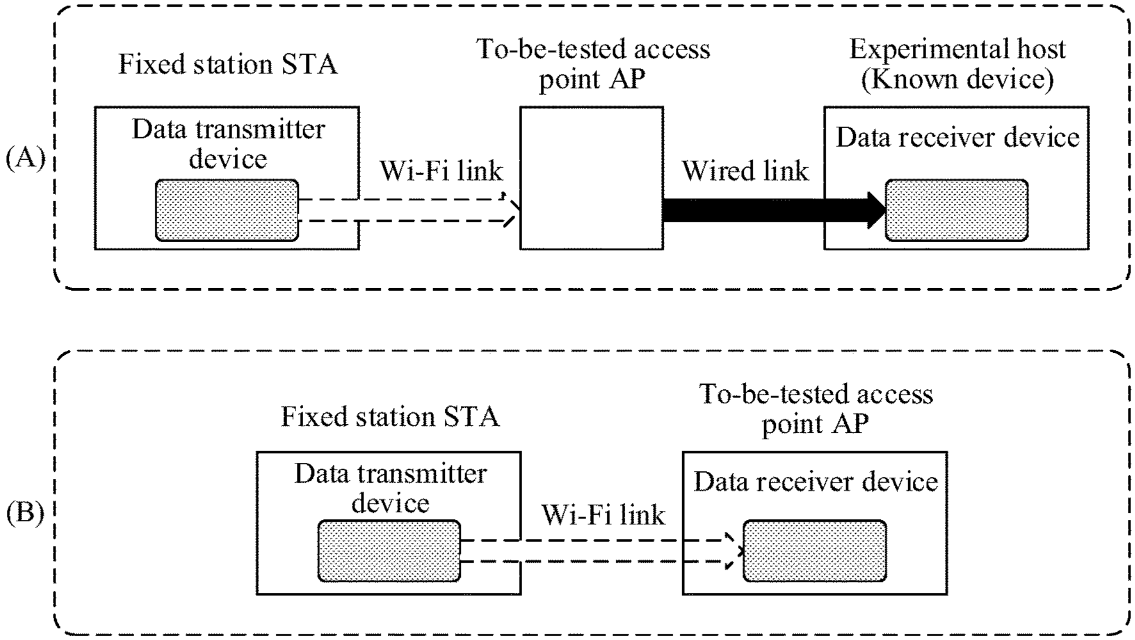
FIG. 10 is a schematic diagram of a test scenario according to some embodiments.

In some embodiments of the present disclosure, as shown in (A) of FIG. 10, if the data transmitter device is a fixed station device (the fixed station device is a specified station device), and the data receiver device is a known device connected to a plurality of to-be-tested access point devices (the figure only shows a case of one to-be-tested access point device), during the test, uplink network performance of the plurality of to-be-tested access point devices may be tested according to reception statuses of the data receiver device (that is, the known device) for data packets respectively transmitted by the specified station device to the plurality of to-be-tested access point devices. In some embodiments, in order to prevent the known device from affecting the network performance test process between the to-be-tested access point device and the fixed station device, the connection between the known device and the to-be-tested access point device may be set to a wired link, and the known device, the to-be-tested access point device, and the station device are located in the same WLAN.

In some embodiments of the present disclosure, as shown in (B) of FIG. 10, if the data transmitter device is a fixed station device (the fixed station device is a specified station device), and the data receiver device is a plurality of to-be-tested access point devices (the figure only shows a case of one to-be-tested access point device), during the test, uplink network performance of the plurality of to-be-tested access point devices may be tested according to reception statuses of the to-be-tested access point devices for data packets respectively transmitted by the specified station device.

Figure 11:
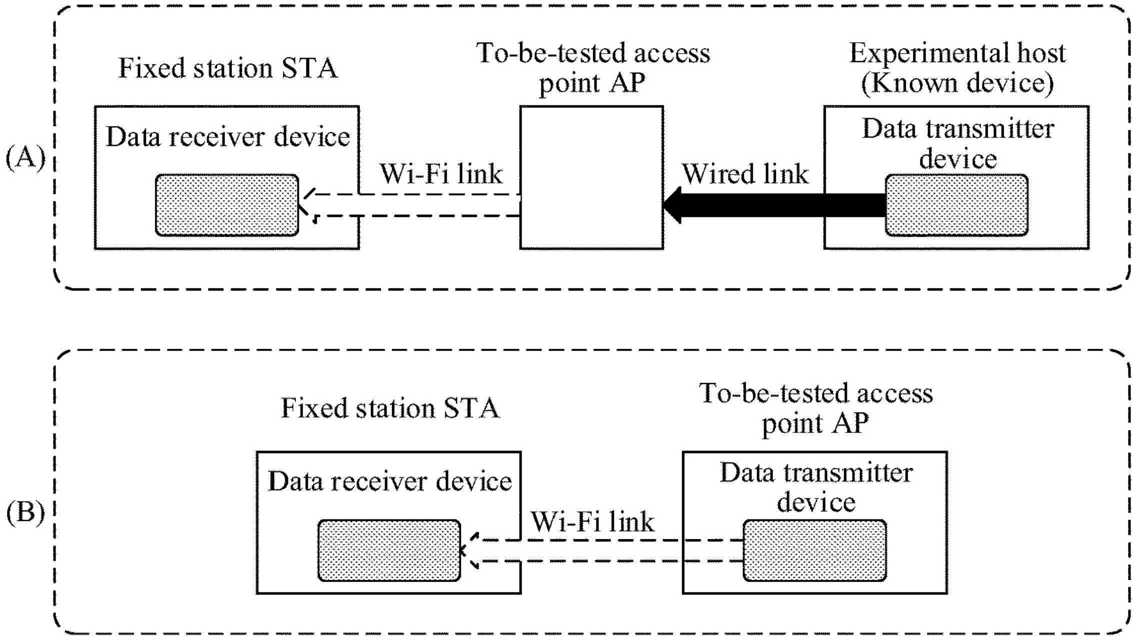
FIG. 11 is a schematic diagram of a test scenario according to some embodiments.

In some embodiments of the present disclosure, as shown in (A) of FIG. 11, if the data transmitter device is a known device (that is, an experimental host) connected to a plurality of to-be-tested access point devices (the figure only shows a case of one to-be-tested access point device), and the data receiver device is a fixed station device (the fixed station device is a specified station device), during the test, downlink network performance of the plurality of to-be-tested access point devices may be tested according to the reception statuses of the fixed station device for data packets respectively from the plurality of to-be-tested access point devices. In some embodiments, in order to prevent the known device from affecting the network performance test process between the to-be-tested access point device and the fixed station device, the connection between the known device and the to-be-tested access point device may be set to a wired link, and the known device, the to-be-tested access point device, and the station device are located in the same WLAN.

In some embodiments of the present disclosure, as shown in (B) of FIG. 11, if the data transmitter device is a plurality of to-be-tested access point devices (the figure only shows a case of one to-be-tested access point device), and the data receiver device is a fixed station device (the fixed station device is a specified station device), during the test, downlink network performance of the plurality of to-be-tested access point devices may be tested according to the reception statuses of the fixed station device for data packets respectively from the plurality of to-be-tested access point devices.

Figure 12:
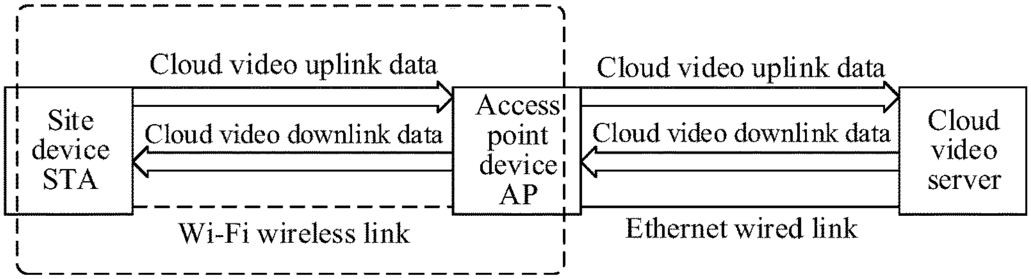
FIG. 12 is a schematic diagram of a test process in a cloud video scenario according to some embodiments.

The implementation process of this embodiment of the present disclosure is described above. In order to further elaborate the details of this embodiment of the present disclosure, detailed descriptions are provided below with reference to specific application scenarios:

As shown in FIG. 12, a cloud video scenario is used as an example. By using the technical solution of this embodiment of the present disclosure, wireless air interface network performance, for example, Wi-Fi 802.11a/b/g/n/ac/ax wireless air interface network performance, between a Wi-Fi station device STA (for example, a smartphone, a tablet computer, a notebook computer, or a smart television) and an access point device AP (for example, a router or a sharer) can be evaluated, where the wireless air interface network performance mainly includes two main indicators: a delay and a throughput. During the evaluation, the network performance of the air interface link of the Wi-Fi wireless link between the station device STA and the access point device AP in the dashed line box shown in FIG. 12 is mainly evaluated, and network performance evaluation other than that of this air interface link (for example, the network segment between the access point device AP and the cloud video server) is not included. In the application scenario shown in FIG. 12, the network performance is evaluated based on data flow features of cloud video applications. The cloud video applications include timely applications with requirements of a high bandwidth and a low delay such as a cloud game, videos, live streaming, and videos on-demand. Certainly, data flow features of other applications may alternatively be used for network performance evaluation.

Figure 13:
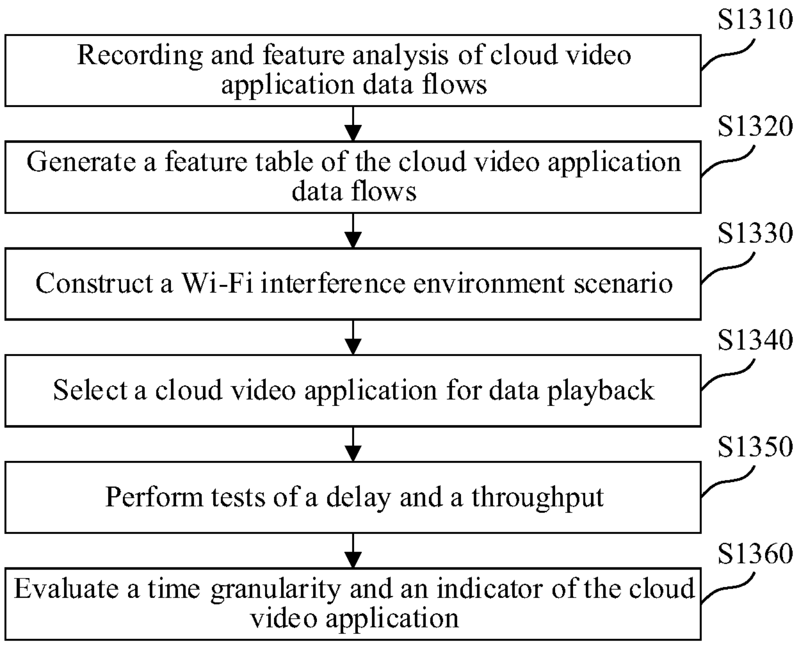
FIG. 13 is a flowchart of a test method in a cloud video scenario according to some embodiments.

The main processes during specific evaluation include: recording, feature analysis, and playback of cloud video data flows, construction of a Wi-Fi interference environment, evaluation of uplink and downlink Wi-Fi network performance, and data evaluation within the corresponding time granularity of cloud video applications. In some embodiments of the present disclosure, as shown in FIG. 13, the main process may specifically include steps S1310 to S1360:

S1310: Recording and feature analysis of cloud video application data flows.

In some embodiments, a general network packet capture and analysis tool (for example, WireShark or tcpdump) may be used to record data packets of a selected cloud video application. For example, a cloud video application service may be actually run on a Wi-Fi STA device (for example, a notebook computer) for a certain period of time (for example, watching the live streaming for ten minutes), the packet capture and analysis tool on the Wi-Fi STA device may be used to record data flows (including uplink and downlink) during this period of time, and then feature analysis may be performed on the data flow. The focus of feature analysis is to extract corresponding values that can describe features from the recorded data flows. The features may include: a data packet average length, a data packet maximum length, a data packet minimum length, an average interval between data packets, a maximum quantity of concurrent TCP flows, and a maximum quantity of concurrent UDP flows.

S1320: Generate a feature table of the cloud video application data flows.

For example, the features of the cloud video application data flows may be shown in Table 1:

S1330: Construct a Wi-Fi interference environment scenario.

In some embodiments of the present disclosure, to accurately evaluate the network performance of a Wi-Fi device, the device's performance in various Wi-Fi air interface interference environment scenarios needs to considered, for example, the capability of the Wi-Fi device to resist air interface interference when running a cloud video application. Typical interference scenarios may be selected from commonly used scenarios, such as an office Wi-Fi network scenario, a home Wi-Fi network scenario, and a shopping mall public Wi-Fi network scenario. Each network scenario has specific interference features, including same-frequency interference, overlapping-frequency interference, and adjacent-frequency interference. Based on these interference features, a Wi-Fi STA device (not a to-be-evaluated device), an AP device (not a to-be-evaluated device), and a 2.4/5 GHz signal generator may be used to construct a stable interference scenario (such as a home Wi-Fi network scenario) in a laboratory environment, for subsequent device network performance evaluation.

In a specific application scenario of the present disclosure, the processing for a Wi-Fi air interface interference environment may be divided into three main processes: collection and recording of the interference environment, feature extraction and quantification of the interference environment, and playback and reproduction based on interference feature variables. These three processes are described as follows:

Collection and recording of the interference environment is mainly to measure and record interference indicator data in the interference environment. Specifically, the objective of the collection is to acquire strength of the four interference dimensions: same-frequency interference, adjacent-frequency interference, overlapping-frequency interference, and non-Wi-Fi signal interference for the current Wi-Fi connection (the current Wi-Fi connection refers to the Wi-Fi connected to a target device selected for measuring the received signal interferences) in the Wi-Fi air interface environment.

In the Wi-Fi environment, there is a technical feature of carrier sense multiple access with collision avoid (CSMA/CA) air interface competition. CSMA/CA is an algorithm for avoiding data transmission conflicts between stations, which is specifically as follows: before transmitting data, if it is detected that the channel is idle, first wait for a period of time, then detect again whether the channel is idle; if the channel is still idle, transmit the data immediately; otherwise, wait for a certain period of time randomly, and when the time expires, detect the channel state again. Based on this technical feature, the interference collection may include the following points: the quantity of interfering Wi-Fi devices, the strength of signals transmitted by the interfering Wi-Fi devices, the channel utilization rate/signal-to-noise ratio/

TABLE 1

| Application name (uplink/downlink) | Data packet average length (byte) | Data packet length range (byte) | Data packet average interval time (ms) | Data packet interval time range (ms) | Maximum quantity of concurrent TCP flows | Maximum quantity of concurrent UDP flows |
|---|---|---|---|---|---|---|
| XX cloud game (downlink) | 21500 | 550-61300 | 16 | 10-30 | 3 | 10 |
| XX cloud game (uplink) | 650 | 80-950 | 30 | 20-45 | 1 | 2 |
| ZZ video (downlink) | 10900 | 3200-18000 | 25 | 2-200 | 8 | 0 |

EVM of the current channel, the packet error rate of the current Wi-Fi connection, the data flow traffic of Wi-Fi interference signals, signal strength and approximate bandwidths of non-Wi-Fi interference signals, and experience indicators (such as a lag rate and a control response time) of an application (for example, a cloud video application).

The quantity of interfering Wi-Fi devices, the strength of signals transmitted by the interfering Wi-Fi devices, the channel utilization rate/signal-to-noise ratio/EVM of the current channel, the packet error rate of the current Wi-Fi connection, and the like mentioned above may recorded based on the Wi-Fi scanning API in the operating system of the device by obtaining beacon frame data of Wi-Fi APs on different channels. The data flow traffic of Wi-Fi interference signals may be recorded through respective air interface packet capturing on different channels through a plurality of pieces of packet capture software (for example, Wi-Fi air interface sniffer). The signal strength and approximate bandwidths of non-Wi-Fi interfering signals may be recorded by using a spectrum analyzer that supports 2.4 GHz and 5 GHz evaluation. The experience indicators of the application may be recorded data of the application's backend server (for example, recorded background data of the cloud video application server).

The recording time of indicator data may be set according to requirements. In order to ensure certain feature extraction efficiency, the recording time of a scenario with greater interference environment changes (for example, a subway scenario) may be longer than the recording time of a scenario with smaller interference environment changes (for example, a home scenario).

After the collection and recording of the interference environment, the next step is to perform feature extraction and quantification on the interference environment, which may include four major types of data: first, statistical results of Wi-Fi's same-frequency, adjacent-frequency, and overlapping-frequency interference recording values; second, the direct measurement results of Wi-Fi's same-frequency, adjacent-frequency, and overlapping-frequency interference recording values; third, the feature values of non-Wi-Fi interference signals; fourth, application experience indicator values.

The statistical results of Wi-Fi's same-frequency, adjacent-frequency, and overlapping-frequency interference recording values are the result values obtained by a chip or software and hardware of the Wi-Fi device by using calculation formulas, and are not directly measured values, such as the channel utilization rate/signal-to-noise ratio/EVM. The characterization manner may be to obtain the average or other statistical data (such as the maximum value and the standard deviation) of these calculated result values during the recording time. An example of the statistical results of Wi-Fi's same-frequency, adjacent-frequency, and overlapping-frequency interference recording values is shown in Table 2 below:

TABLE 2

| Interference type | Channel utilization rate | Signal-to-noise ratio | Error vector magnitude EVM |
|---|---|---|---|
| Same-frequency interference | 32.1% | 13 dB | −18 dB |
| Adjacent-frequency interference | 18.2% | 16 dB | −2 dB |
| Overlapping-frequency interference | 20.5% | 20 dB | −6 dB |

In Table 2, the specific values in the statistical results of the Wi-Fi's same-frequency, adjacent-frequency, and overlapping-frequency interference recording values are average values in the measurement process.

The direct measurement results of the Wi-Fi's same-frequency, adjacent-frequency, and overlapping-frequency interference recording values are values that can be obtained directly through measurement, such as the quantity of interfering Wi-Fi devices, the strength of signals of interfering Wi-Fi devices, the bandwidths of interfering Wi-Fi devices, and the data flow traffic of the Wi-Fi interference signals. A specific example is shown in Table 3:

TABLE 3

| Interference type | Device quantity | Maximum signal strength of the devices | Most frequently used bandwidth of the devices | The total data flow traffic of the devices |
|---|---|---|---|---|
| Same-frequency interference | 3 | −32 dBm | 40 MHz | 35.2 Mb/s |
| Adjacent-frequency interference | 4 | −67 dBm | 20 MHz | 24.6 Mb/s |
| Overlapping-frequency interference | 5 | −55 dBm | 80 MHz | 90.2 Mb/s |

The feature value of the non-Wi-Fi interference signal may be used for representing the continuous signal strength of the non-Wi-Fi interference signal in the time domain and frequency domain, which may specifically be characterized into the bandwidth distribution and signal strength distribution at the selected time granularity. As shown in Table 4, it may be divided into three time periods (this is only an example, and in other embodiments of the present disclosure, it may be divided into any quantity of time periods), and then a bandwidth corresponding to the strongest average signal strength in each time period is selected, and recorded as a bandwidth distribution 1; and then a bandwidth corresponding to the second strongest average signal strength continues to be selected, and is recorded as a bandwidth distribution 2. The bandwidth distributions corresponding to the top three (this is only an example, and in other embodiments of the present disclosure, any quantity of bandwidth distributions may be selected) average signal strength ranked according to the signal strength are sequentially selected and recorded. Details are shown in Table 4:

TABLE 4

| Time period | Bandwidth distribution 1/average signal strength | Bandwidth distribution 2/average signal strength | Bandwidth distribution 3/average signal strength |
|---|---|---|---|
| 0 to 5 seconds | 5020-5050 MHz/ −43 dBm | 5220-5247 MHz/ −48 dBm | 5410-5493 MHz/ −53 dBm |
| 6 to 8 seconds | 5220-5280 MHz/ −38 dBm | 5390-5423 MHz/ −49 dBm | 5108-5123 MHz/ −55 dBm |
| 9 to 10 seconds | 5079-5103 MHz/ −45 dBm | 5400-5439 MHz/ −47 dBm | 5200-5282 MHz/ −50 dBm |

The application experience indicator values may be data recorded from the application backend server. The application backend server may be, for example, a cloud video application backend server. These values do not need to be characterized and may be recorded directly. For example, the values may be shown in Table 5 below:

TABLE 5

| Lag rate | Average video frame delay | Average control response time |
|---|---|---|
| 1.27% | 4.5 ms | 3.2 ms |

After completing the feature extraction and quantification on the interference environment, playback and reproduction may be performed based on the interference feature variables, that is, a simulated interference environment can be constructed. Several methods of reproduction are listed below:

One of the manners of playback and reproduction of the interference environment includes: using the foregoing Table 3 and Table 4 to construct a simulation environment similar to the experience index values shown in Table 5, to achieve reproduction of the interference environment.

Specifically, the feature variables shown in Table 3 are used for reproducing the Wi-Fi interference environment. First, an equal quantity of devices are configured in the laboratory environment according to the quantity of same-frequency/adjacent-frequency/overlapping-frequency interference devices, and then bandwidths of same-frequency/adjacent-frequency/overlapping-frequency interference devices are separately configured, and data flows (such as TCP data flows or UDP data flows) are transmitted on the devices, so that the total traffic of the interference data flows in each frequency band is equal to that recorded in Table 2.

The feature variables shown in Table 4 are used for reproducing the non-Wi-Fi signal interference environment. A full-band signal generator capable of operating at 2.4G/5 GHz is used to adjust the spectrum transmission configuration of bandwidth distributions and average signal strength according to the time periods in Table 4 at the beginning of each time period, to achieve the effect of reproducing the non-Wi-Fi signal interference environment.

After reproducing the interference environment, the background data of the application server is varied, and the relationship between the actual experience indicator values and the user experience data values shown in Table 5 is confirmed. If the difference is relatively large, some feature variables in Table 3 and Table 4 may be appropriately adjusted, to make the actual experience index values as close as possible to the user experience data values shown in Table 5, so that a simulation environment matching the actual interference environment can be constructed.

The second manner of playback and reproduction of the interference environment includes: using the interference environment feature variables shown in Table 2 to construct a simulation environment similar to the experience index values shown in Table 5 to achieve the reproduction of the interference environment.

The feature variables shown in Table 2 are used for representing the interference result values in the same-frequency/adjacent-frequency/overlapping-frequency environment, are results calculated according to a formula, and have objectively represented the degree of interference. Therefore, for reproduction in the laboratory scenario, a combination of a Wi-Fi device and a full-band signal generator capable of operating at 2.4G/5 GHz may be used. The quantity, bandwidths, and traffic of used devices are not limited. The objective is that feature numerical results similar to those shown in Table 2 can be constructed.

After reproducing the interference environment, the background data of the application server is varied, and the relationship between the actual experience indicator values and the user experience data values shown in Table 5 is confirmed. If the difference is relatively large, some feature variables in Table 2 may be appropriately adjusted, to make the actual experience index values as close as possible to the user experience data values shown in Table 5, so that a simulation environment matching the actual interference environment can be constructed.

Based on the above, by using the technical solution of this embodiment of the present disclosure, the interference indicator data in various interference environments (such as an indoor environment, an office environment, a subway station environment, and a high-speed moving environment) can be recorded, and then a WLAN interference environment can be restored in the laboratory environment, to create a playback effect of the interference environment, which facilitates implementation of development of the WLAN technology and the performance evaluation of a WLAN device in the restored interference environment.

S1340: Select a Cloud Video Application for Data Playback.

After the interference environment is constructed, the network performance of the Wi-Fi device cloud video application may be evaluated in the laboratory environment, for example, evaluating the network performance between a Wi-Fi STA device and a Wi-Fi AP device. By testing the configuration between the wired link and the wireless link in the network and changing the data receiving and transmitting roles, the uplink and downlink Wi-Fi network performance can be separately evaluated. Specifically, referring to FIG. 6 to FIG. 11, the network performance of the STA device and the AP device may be tested by changing the data transmitter and the data receiver. The experimental hosts shown in FIG. 6 to FIG. 11 may use the Windows, Linux, or MacOS operating system. The experimental host needs to be located in the same local area network as the STA device and the AP device, to isolate the influence of the operator's network.

S1350: Perform Tests of a Delay and a Throughput.

Figure 14:
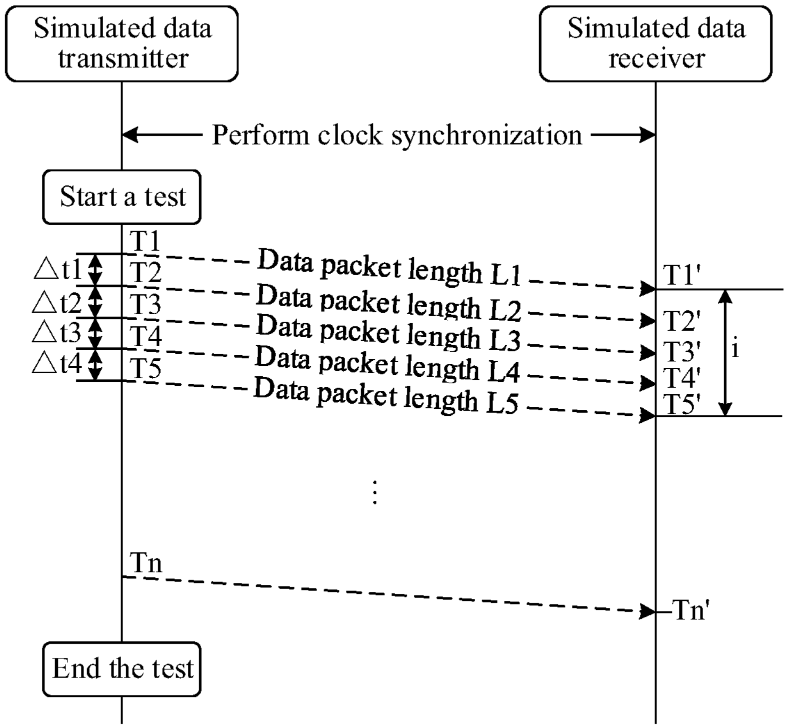
FIG. 14 is a schematic diagram of an interaction process between a data packet transmitting end and a data packet receiving end according to some embodiments.

In some embodiments of the present disclosure, as shown in FIG. 14, before the evaluation, the data packet transmitting end and the data packet receiving end need to perform clock synchronization. In this way, when receiving a data packet, the receiving end does not need to return the data packet to the transmitting end, and a timestamp (the local time of the transmitter attached by the transmitting end during packet transmission) contained in the data packet may be directly compared with the local time locally at the receiving end, to obtain the delay of data packet transmission, thereby effectively calculating the one-way delay. Clock synchronization can ensure synchronization at the microsecond level. For example, the IEEE1588 precision time protocol (PTP) standard or the global positioning system (GPS) clock may be used.

The features of application data packet transmission need to be simulated according to the foregoing feature table (that is, Table 1). The packet length, the packet transmission interval, the quantity of concurrent TCP flows or UDP flows are selected according to the feature values. To make the simulation more accurately reflect the application features, the transmitter needs to control the changes in the packet length and the packet transmission interval, can establish any quantity of TCP flows and UDP flows with the receiver, and plays back features of the cloud video application during data flow recording as much as possible. As shown in FIG. 14, the transmitter's data packet transmission intervals Δt1, Δt2, Δt3, and Δt4 are variable, and the lengths L1, L2, L3, L4, and L5 of transmitted packets are also variable. After receiving the data packet transmitted from the transmitter, the data receiver performs packet analysis from the MAC layer to the IP layer to the TCP layer or UDP layer to confirm whether the data packet has been received correctly. If the data packet cannot be received correctly, it will be recorded as a packet loss. Observe and collect statistics on throughput-related and delay-related indicator data according to the set time granularity. It is assumed that the statistical time granularity is i, then the receiver collects statistics on the delay and the throughput every time i.

S1360: Evaluate a Time Granularity and an Indicator of the Cloud Video Application.

In some embodiments, in FIG. 14, the delays of data packets during transmission are: T1'-T1, T2'-T2, T3'-T3, T4'-T4, and T5'-T5. During evaluation of the network performance of the device, the delay statistics may be the average value within time granularity i, the total delay within time granularity i, or another statistical value (such as a maximum value, a minimum value, or a set value ratio). The throughput may be a sum of throughputs within the time granularity, or another statistical value (such as a maximum value, a minimum value, or a set value ratio).

For example, the test statistical results of the device network performance are shown in Table 6. Evaluation results of cloud video application network performance of the Wi-Fi device is formed according to the application name, uplink or downlink, the Wi-Fi interference environment, and the distribution of statistical time granularity within the measurement time.

TABLE 6

| Application name (uplink/downlink) | Evaluated Wi-Fi device name | Wi-Fi interference scenario | Packet loss rate | Throughput lower than a threshold ratio | Throughput drop-to-0 ratio | Delay exceeds a threshold ratio |
|---|---|---|---|---|---|---|
| XX cloud game (downlink) | STA device A | Home | 0.57% | 1.38% | 0.25% | 1.19% |
| XX cloud game (uplink) | AP device B | Office | 0.91% | 3.51% | 1.25% | 1.35% |
| ZZ video (downlink) | Combination of an STA device C and an AP device D | Shopping mall | 1.28% | 2.29% | 0.98% | 2.09% |

Based on the above, by using the technical solution of this embodiment of the present disclosure, a relatively stable WLAN simulation environment can be constructed based on an interference environment index feature of a WLAN, and simulation of a data packet in an actual scenario can be implemented by controlling a data transmitter device to transmit a data packet according to a data flow feature value, which avoids influence of other factors on the network performance test, thereby helping to improve the accuracy of the network performance test of a Wi-Fi device.

The following describes apparatus embodiments of the present disclosure, and the apparatus embodiments may be used for performing the WLAN device test method in the foregoing embodiment of the present disclosure. For details not disclosed in the apparatus embodiments of the present disclosure, reference may be made to the foregoing embodiments of the WLAN device test method in the present disclosure.

Figure 15:
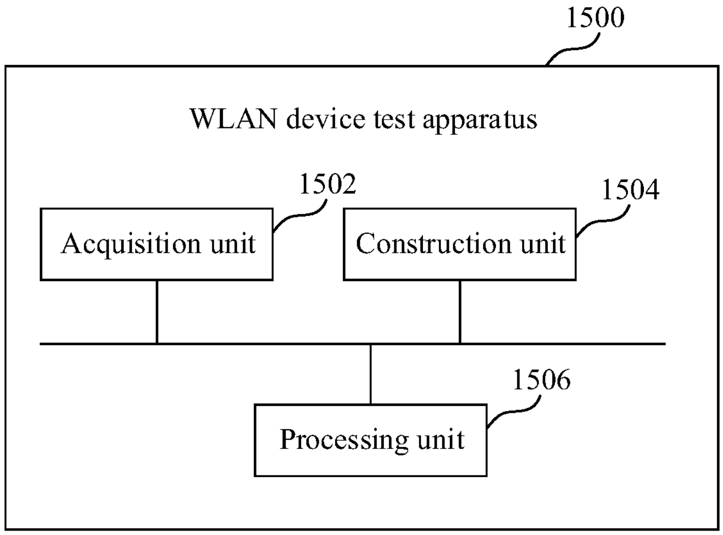
FIG. 15 is a block diagram of a WLAN device test apparatus according some embodiments.

FIG. 15 is a block diagram of a WLAN device test apparatus according to some embodiments of the present disclosure. The WLAN device test apparatus may be arranged in a device having a computing processing function.

Referring to FIG. 15, a WLAN device test apparatus 1500 according to some embodiments of the present disclosure includes an acquisition unit 1502, a construction unit 1504, and a processing unit 1506.

The acquisition unit 1502 is configured to acquire a data flow feature value used for testing a WLAN device; the construction unit 1504 is configured to construct, according to an interference environment index feature of a WLAN, a WLAN simulation environment corresponding to the interference environment index feature; the processing unit 1506 is configured to: in the WLAN simulation environment, control a data transmitter device to transmit a data packet according to the data flow feature value, and acquire a reception status of a data receiver device for the data packet; and the processing unit 1506 is further configured to test network performance of at least one of the data transmitter device or the data receiver device in the WLAN simulation environment according to the reception status of the data receiver device for the data packet.

In some embodiments of the present disclosure, based on the foregoing solutions, the acquisition unit 1502 is configured to: capture, in a process of receiving a specified data flow by a specified device, the specified data flow; and generate a feature value of the specified data flow according to a capture result for the specified data flow, and use the feature value of the specified data flow as the data flow feature value used for testing the WLAN device.

In some embodiments of the present disclosure, based on the foregoing solutions, the data flow feature value includes at least one of the following: a data packet average length in a data flow, a data packet length range in the data flow, a data packet average transmission interval in the data flow, a data packet transmission interval range in the data flow, a maximum quantity of concurrent transmission control protocol (TCP) flows, or a maximum quantity of concurrent user datagram protocol (UDP) flows.

In some embodiments of the present disclosure, based on the foregoing solutions, the data transmitter device is a to-be-tested station device, and the data receiver device is a to-be-tested access point device or the data receiver device is a known device connected to a to-be-tested access point device; and the processing unit 1506 is configured to: test, according to the reception status of the data receiver device for the data packet transmitted by the to-be-tested station device, uplink network performance of a device combination formed by the to-be-tested access point device and the to-be-tested station device.

In some embodiments of the present disclosure, based on the foregoing solutions, the data transmitter device is a to-be-tested access point device or the data transmitter device is a known device connected to a to-be-tested access point device, and the data receiver device is a to-be-tested station device; and the processing unit 1506 is configured to: test, according to the reception status of the to-be-tested station device for the data packet transmitted by the data transmitter device, downlink network performance of a device combination formed by the to-be-tested access point device and the to-be-tested station device.

In some embodiments of the present disclosure, based on the foregoing solutions, the data transmitter device is a plurality of to-be-tested station devices, and the data receiver device is a specified access point device or the data receiver device is a known device connected to a specified access point device; and the processing unit 1506 is configured to: test uplink network performance of the plurality of to-be-tested station devices according to reception statuses of the data receiver device for data packets respectively transmitted by the plurality of to-be-tested station devices.

In some embodiments of the present disclosure, based on the foregoing solutions, the data transmitter device is a specified access point device or the data transmitter device is a known device connected to a specified access point device, and the data receiver device is a plurality of to-be-tested station devices; and the processing unit 1506 is configured to: test downlink network performance of the plurality of to-be-tested station devices according to a reception status of each of the plurality of to-be-tested station devices for the data packet transmitted by the data transmitter device.

In some embodiments of the present disclosure, based on the foregoing solutions, the data transmitter device is a specified station device, and the data receiver device is a plurality of to-be-tested access point devices or the data receiver device is a known device connected to a plurality of to-be-tested access point devices; and the processing unit 1506 is configured to: test uplink network performance of the plurality of to-be-tested access point devices according to reception statuses of the data receiver device for data packets respectively transmitted by the specified station device to the plurality of to-be-tested access point devices.

In some embodiments of the present disclosure, based on the foregoing solutions, the data transmitter device is a plurality of to-be-tested access point devices or the data transmitter device is a known device connected to a plurality of to-be-tested access point devices, and the data receiver device is a specified station device; and the processing unit 1506 is configured to: test downlink network performance of the plurality of to-be-tested access point devices according to reception statuses of the specified station device for data packets respectively from the plurality of to-be-tested access point devices.

In some embodiments of the present disclosure, based on the foregoing solutions, the known device, the access point device, and the station device are located in a same WLAN, and a wired connection link is established between the known device and the access point device.

In some embodiments of the present disclosure, based on the foregoing solutions, the processing unit 1506 is configured to: control the data transmitter device to transmit a data packet within at least one time window according to the data flow feature value; and acquire a reception status of the data receiver device for the data packet transmitted by the data transmitter device within each of the at least one time window.

In some embodiments of the present disclosure, based on the foregoing solutions, the data packet transmitted by the data transmitter device includes local time information of the data transmitter device; and the processing unit 1506 is further configured to: before the controlling a data transmitter device to transmit a data packet according to the data flow feature value, control the data transmitter device to perform clock synchronization with the data receiver device.

Figure 16:
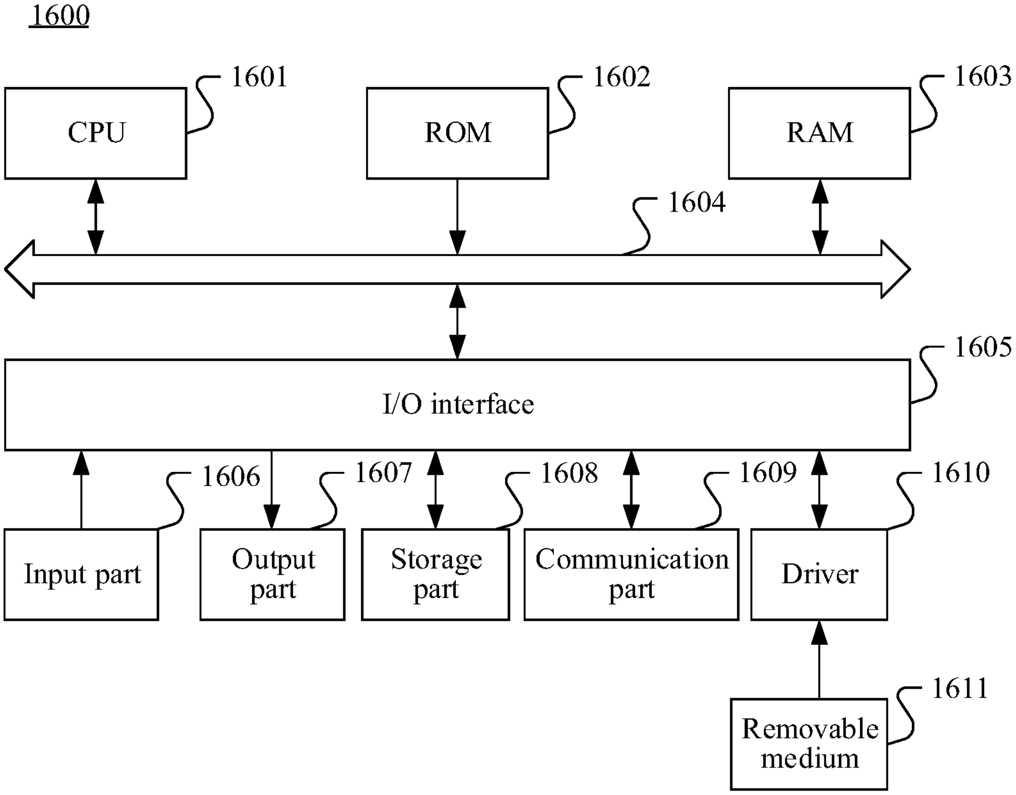
FIG. 16 is a schematic structural diagram of a computer system adapted to implement an electronic device according to some embodiments.

FIG. 16 is a schematic structural diagram of a computer system adapted to implement an electronic device according to some embodiments of the present disclosure.

A computer system 1600 of the electronic device shown in FIG. 16 is merely an example, and does not constitute any limitation on functions and use ranges of the embodiments of the present disclosure.

As shown in FIG. 16, the computer system 1600 includes a central processing unit (CPU) 1601, which may perform various suitable actions and processing based on a program stored in a read-only memory (ROM) 1602 or a program loaded from a storage part 1608 into a random access memory (RAM) 1603, for example, perform the method described in the foregoing embodiments. The RAM 1603 further stores various programs and data required for system operations. The CPU 1601, the ROM 1602, and the RAM 1603 are connected to each other through a bus 1604. An input/output (I/O) interface 1605 is also connected to the bus 1604.

The following components are connected to the I/O interface 1605: an input part 1606 including a keyboard, a mouse, or the like, an output part 1607 including a cathode ray tube (CRT), a liquid crystal display (LCD), a speaker, or the like, a storage part 1608 including a hard disk, or the like, and a communication part 1609 including a network interface card such as a local area network (LAN) card or a modem. The communication part 1609 performs communication processing by using a network such as the Internet. A driver 1610 is also connected to the I/O interface 1605 as required. A removable medium 1611, such as a magnetic disk, an optical disc, a magneto-optical disk, or a semiconductor memory, is installed on the drive 1610 as required, so that a computer program read from the removable medium is installed into the storage part 1608 as required.

According to some embodiments of the present disclosure, the processes described above by referring to the flowcharts may be implemented as computer software programs. For example, some embodiments of the present disclosure includes a computer program product, the computer program product includes a computer program carried on a computer-readable medium, and the computer program includes a computer program used for performing the methods shown in the flowcharts. In such some embodiments, the computer program may be downloaded and installed from a network through the communication part 1609, and/or installed from the removable medium 1611. When the computer program is executed by the CPU 1601, the various functions defined in the system of the present disclosure are executed.

The computer-readable medium shown in the embodiments of the present disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disc read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal being in a baseband or propagated as a part of a carrier wave, the data signal carrying computer-readable computer program. The propagated data signal may be in a plurality of forms, including but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the present disclosure may be implemented in a software manner, or may be implemented in a hardware manner, and the unit described can also be set in a processor. Names of the units do not constitute a limitation on the units in a specific case.

According to another aspect, the present disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of the present disclosure, the features and functions of two or more modules or units described above may be embodied in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the implementations of the present disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of the present disclosure.

After considering the specification and practicing the implementations of the present disclosure, a person skilled in the art may easily conceive of other implementations of the present disclosure. The present disclosure is intended to cover any variations, uses, or adaptive changes of the present disclosure following the general principles of the present disclosure, and includes well-known knowledge and conventional technical means in the art and undisclosed in the present disclosure.

It is to be understood that the present disclosure is not limited to the precise structures described above and shown in the accompanying drawings, and various modifications and changes may be made without departing from the scope of the present disclosure. The scope of the present disclosure is subject only to the appended claims.

What is claimed is:

1. A method for testing a wireless local area network (WLAN) device, performed by an electronic device, the method comprising:

acquiring a data flow feature value used for testing a WLAN device;

generating a WLAN simulation environment based on an interference environment index feature of a WLAN;

controlling a data transmitter device to perform clock synchronization with a data receiver device, and in the WLAN simulation environment to transmit a data packet according to the data flow feature value;

acquiring a reception status of the data receiver device for the data packet; and testing network performance of at least one of the data transmitter device or the data receiver device in the WLAN simulation environment based on the reception status of the data receiver device for the data packet, wherein generating the WLAN simulation environment comprises:

measuring interference indicator information in a WLAN interference environment to obtain indicator measurement results;

generating an interference signal feature value statistical result based on the indicator measurement results; and constructing, based on interference signal feature values contained in the interference signal feature value statistical result, a simulation environment such that an experience index measurement value in the simulation environment matches an experience indicator feature value statistical result.

2. The method according to claim 1, wherein the acquiring a data flow feature value used for testing a WLAN device comprises:

capturing a specified data flow, wherein the specified data flow is being received by a specified device; and generating a feature value of the specified data flow according to a capture result for the specified data flow, wherein the feature value of the specified data flow is used as the data flow feature value for testing the WLAN device.

3. The method according to claim 1, wherein the data flow feature value comprises at least one of a data packet average length in a data flow, a data packet length range in the data flow, a data packet average transmission interval in the data flow, a data packet transmission interval range in the data flow, a maximum quantity of concurrent transmission control protocol (TCP) flows, or a maximum quantity of concurrent user datagram protocol (UDP) flows.

4. The method according to claim 1, wherein the data transmitter device is a to-be-tested station device, and the data receiver device is a to-be-tested access point device or a known device connected to a to-be-tested access point device; and testing network performance of at least one of the data transmitter device or the data receiver device in the WLAN simulation environment based on the reception status of the data receiver device for the data packet comprises:

testing uplink network performance of a device combination formed by the to-be-tested access point device and the to-be-tested station device based on the reception status of the data receiver device for the data packet transmitted by the to-be-tested station device.

5. The method according to claim 1, wherein the data transmitter device is a to-be-tested access point device or a known device connected to a to-be-tested access point device, and the data receiver device is a to-be-tested station device; and testing network performance of at least one of the data transmitter device or the data receiver device in the WLAN simulation environment based on the reception status of the data receiver device for the data packet comprises:

testing, downlink network performance of a device combination formed by the to-be-tested access point device and the to-be-tested station device based on the reception status of the to-be-tested station device for the data packet transmitted by the data transmitter device.

6. The method according to claim 1, wherein the data transmitter device is a plurality of to-be-tested station devices, and the data receiver device is a specified access point device or a known device connected to a specified access point device; and testing network performance of at least one of the data transmitter device or the data receiver device in the WLAN simulation environment based on the reception status of the data receiver device for the data packet comprises:

testing uplink network performance of the plurality of to-be-tested station devices based on reception statuses of the data receiver device for data packets respectively transmitted by the plurality of to-be-tested station devices.

7. The method according to claim 1, wherein the data transmitter device is a specified access point device or a known device connected to a specified access point device, and the data receiver device is a plurality of to-be-tested station devices; and testing network performance of at least one of the data transmitter device or the data receiver device in the WLAN simulation environment based on the reception status of the data receiver device for the data packet comprises:

testing downlink network performance of the plurality of to-be-tested station devices based on a reception status of each of the plurality of to-be-tested station devices for the data packet transmitted by the data transmitter device.

8. The method according to claim 1, wherein the data transmitter device is a specified station device, and the data receiver device is a plurality of to-be-tested access point devices or a known device connected to a plurality of to-be-tested access point devices; and testing network performance of at least one of the data transmitter device or the data receiver device in the WLAN simulation environment based on the reception status of the data receiver device for the data packet comprises:

testing uplink network performance of the plurality of to-be-tested access point devices based on reception statuses of the data receiver device for data packets respectively transmitted by the specified station device to the plurality of to-be-tested access point devices.

9. The method according to claim 1, wherein the data transmitter device is a plurality of to-be-tested access point devices or a known device connected to a plurality of to-be-tested access point devices, and the data receiver device is a specified station device; and testing network performance of at least one of the data transmitter device or the data receiver device in the WLAN simulation environment based on the reception status of the data receiver device for the data packet comprises:

testing downlink network performance of the plurality of to-be-tested access point devices based on reception statuses of the specified station device for data packets respectively from the plurality of to-be-tested access point devices.

10. The method according to claim 1, wherein the controlling comprises:

controlling the data transmitter device to transmit a data packet within at least one time window according to the data flow feature value; and acquiring a reception status of the data receiver device for the data packet transmitted by the data transmitter device within each of the at least one time window.

11. An apparatus for updating a route selection policy, the apparatus comprising:

at least one non-transitory memory containing program code; and at least one processor configured to execute the program code, the program code comprising:

first acquiring code configured to cause the at least one processor to acquire a data flow feature value used for testing a WLAN device;

first generating code configured to cause the at least one processor to generate a WLAN simulation environment based on an interference environment index feature of a WLAN;

first controlling code configured to cause the at least one processor to control a data transmitter device to perform clock synchronization with a data receiver device, and in the WLAN simulation environment to transmit a data packet according to the data flow feature value;

second acquiring code configured to cause the at least one processor to acquire a reception status of a data receiver device for the data packet; and first testing code configured to cause the at least one processor to test network performance of at least one of the data transmitter device or the data receiver device in the WLAN simulation environment based on the reception status of the data receiver device for the data packet, wherein the first generating code is further configured to cause the at least one processor to:

measure interference indicator information in a WLAN interference environment to obtain indicator measurement results;

generate an interference signal feature value statistical result based on the indicator measurement results; and construct, based on interference signal feature values contained in the interference signal feature value statistical result, a simulation environment such that an experience index measurement value in the simulation environment matches an experience indicator feature value statistical result.

12. The apparatus according to claim 11, wherein the second acquiring code is further configured to cause the at least one processor to:

capture a specified data flow, wherein the specified data flow is being received by a specified device; and generate a feature value of the specified data flow according to a capture result for the specified data flow, wherein the feature value of the specified data flow is used as the data flow feature value for testing the WLAN device.

13. The apparatus according to claim 11, wherein the data flow feature value comprises at least one of a data packet average length in a data flow, a data packet length range in the data flow, a data packet average transmission interval in the data flow, a data packet transmission interval range in maximum quantity of concurrent user datagram protocol (UDP) flows.

14. The apparatus according to claim 11, wherein the data transmitter device is a to-be-tested station device, and the data receiver device is a to-be-tested access point device or a known device connected to a to-be-tested access point device; and the first testing code is further configured to cause the at least one processor to:

test uplink network performance of a device combination formed by the to-be-tested access point device and the to-be-tested station device based on the reception status of the data receiver device for the data packet transmitted by the to-be-tested station device.

15. The apparatus according to claim 11, wherein the data transmitter device is a to-be-tested access point device or a known device connected to a to-be-tested access point device, and the data receiver device is a to-be-tested station device; and the first testing code is further configured to cause the at least one processor to:

test downlink network performance of a device combination formed by the to-be-tested access point device and the to-be-tested station device based on the reception status of the to-be-tested station device for the data packet transmitted by the data transmitter device.

16. The apparatus according to claim 11, wherein the data transmitter device is a plurality of to-be-tested station devices, and the data receiver device is a specified access point device or a known device connected to a specified access point device; and the first testing code is further configured to cause the at least one processor to:

test uplink network performance of the plurality of to-be-tested station devices based on reception statuses of the data receiver device for data packets respectively transmitted by the plurality of to-be-tested station devices.

17. The apparatus according to claim 11, wherein the data transmitter device is a specified access point device or a known device connected to a specified access point device, and the data receiver device is a plurality of to-be-tested station devices; and the first testing code is further configured to cause the at least one processor to:

test downlink network performance of the plurality of to-be-tested station devices based on a reception status of each of the plurality of to-be-tested station devices for the data packet transmitted by the data transmitter device.

18. The apparatus according to claim 11, wherein the data transmitter device is a specified station device, and the data receiver device is a plurality of to-be-tested access point devices or a known device connected to a plurality of to-be-tested access point devices; and the first testing code is further configured to cause the at least one processor to:

test uplink network performance of the plurality of to-be-tested access point devices based on reception statuses of the data receiver device for data packets respectively transmitted by the specified station device to the plurality of to-be-tested access point devices.

19. The apparatus according to claim 11, wherein the data transmitter device is a plurality of to-be-tested access point devices or a known device connected to a plurality of to-be-tested access point devices, and the data receiver device is a specified station device; and the first testing code is further configured to cause the at least one processor to:

test downlink network performance of the plurality of to-be-tested access point devices based on reception statuses of the specified station device for data packets respectively from the plurality of to-be-tested access point devices.

20. A non-transitory computer-readable medium for vehicle control containing program code that when executed by at least one processor, causes the at least one processor to:

acquire a data flow feature value used for testing a WLAN device;

generate a WLAN simulation environment based on an interference environment index feature of a WLAN;

control a data transmitter device to perform clock synchronization with a data receiver device and, and in the WLAN simulation environment to transmit a data packet according to the data flow feature value;

acquire a reception status of a data receiver device for the data packet;

test network performance of at least one of the data transmitter device or the data receiver device in the WLAN simulation environment based on the reception status of the data receiver device for the data packet;

wherein the generating the WLAN simulation environment comprises:

measure interference indicator information in a WLAN interference environment to obtain indicator measurement results;

generate an interference signal feature value statistical result based on the indicator measurement results; and construct, based on interference signal feature values contained in the interference signal feature value statistical result, a simulation environment such that an experience index measurement value in the simulation environment matches an experience indicator feature value statistical result.

* * * * *